United States Patent [19]
Jan

[11] Patent Number: 5,888,394
[45] Date of Patent: Mar. 30, 1999

[54] METHOD AND APPARATUS FOR SEWAGE WATER TREATMENT

[76] Inventor: Topol Jan, Cirkvice 19, 28533 Cirkvice, Ukutne Hory, CS, Czech Rep.

[21] Appl. No.: 849,348

[22] PCT Filed: Dec. 4, 1995

[86] PCT No.: PCT/CZ95/00027

§ 371 Date: May 27, 1997

§ 102(e) Date: May 27, 1997

[87] PCT Pub. No.: WO96/16908

PCT Pub. Date: Jun. 6, 1996

[30] Foreign Application Priority Data

Dec. 2, 1994 [CZ] Czech Rep. .............................. 3008-94

[51] Int. Cl.$^6$ .......................................................... C02F 3/30
[52] U.S. Cl. .......................... 210/605; 210/621; 210/624; 210/104; 210/195.3; 210/202; 210/903
[58] Field of Search ..................................... 210/605, 614, 210/621, 624, 626, 630, 104, 195.1, 195.3, 202, 258, 259, 903

[56] References Cited

U.S. PATENT DOCUMENTS

| | | | |
|---|---|---|---|
| 4,167,479 | 9/1979 | Besik | 210/630 |
| 4,663,044 | 5/1987 | Gornszy | 210/624 |
| 4,966,705 | 10/1990 | Jamieson et al. | 210/605 |
| 5,013,441 | 5/1991 | Goronszy | 210/605 |
| 5,342,523 | 8/1994 | Kuwashima | 210/605 |
| 5,605,629 | 2/1997 | Rogalla | 210/903 |

FOREIGN PATENT DOCUMENTS

| | | |
|---|---|---|
| 557608 | 12/1986 | Australia . |
| 395413 | 12/1992 | Austria . |
| 2401101 | 3/1979 | France . |
| 2553752 | 4/1985 | France . |

*Primary Examiner*—Christopher Upton
*Attorney, Agent, or Firm*—Notaro & Michalos P.C.

[57] ABSTRACT

Method for sewage water treatment using suspended activated sludge where sewage water is supplied to the equalizing tank being then re-pumped to the activation tank from which is supplied to the post-sedimentation tank after the clearing process and from here, after the remaining sludge sedimentation, to the drainage. The activation process is automatically interrupted after a drop of the sewage water level in the equalizing tank below the minimum level setting and the excessive sludge is then pumped off from the activation tank. The sludge re-pumping is interrupted and the activation process restored owing to the subsequent raising of the sewage water level in excess of the operation level setting.

3 Claims, 3 Drawing Sheets

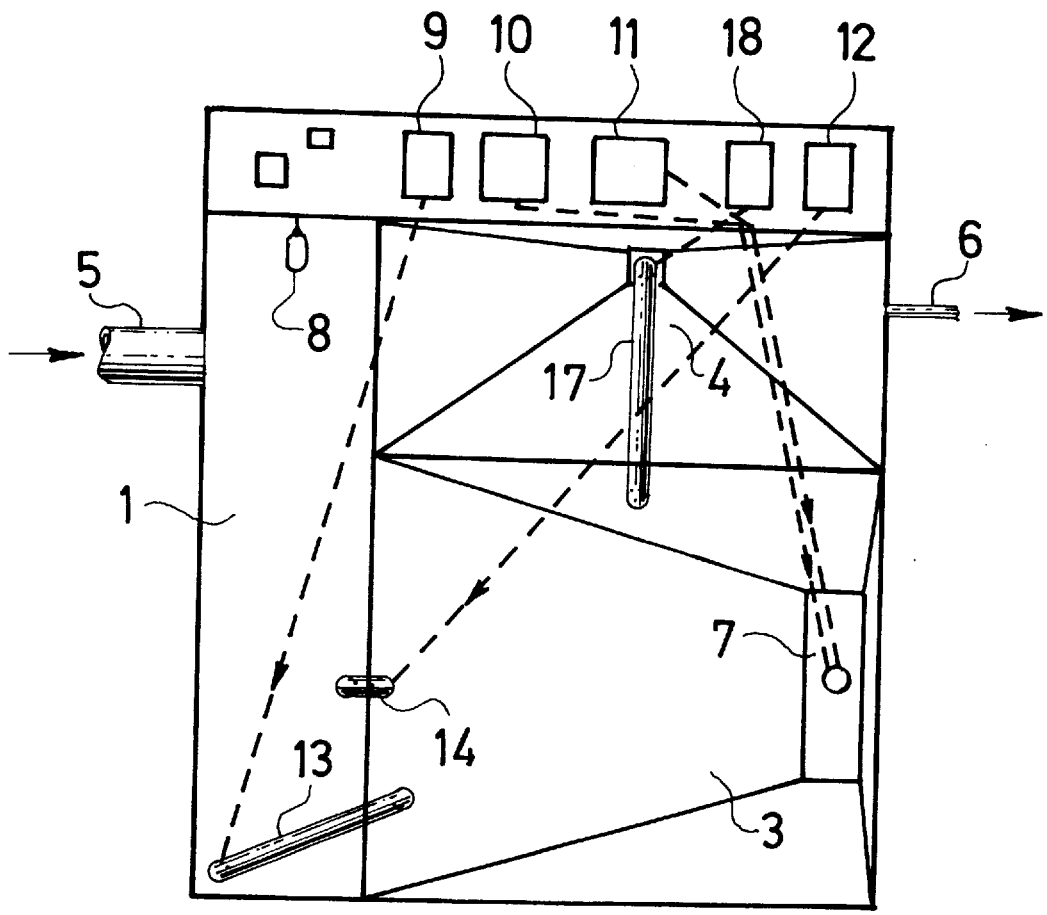

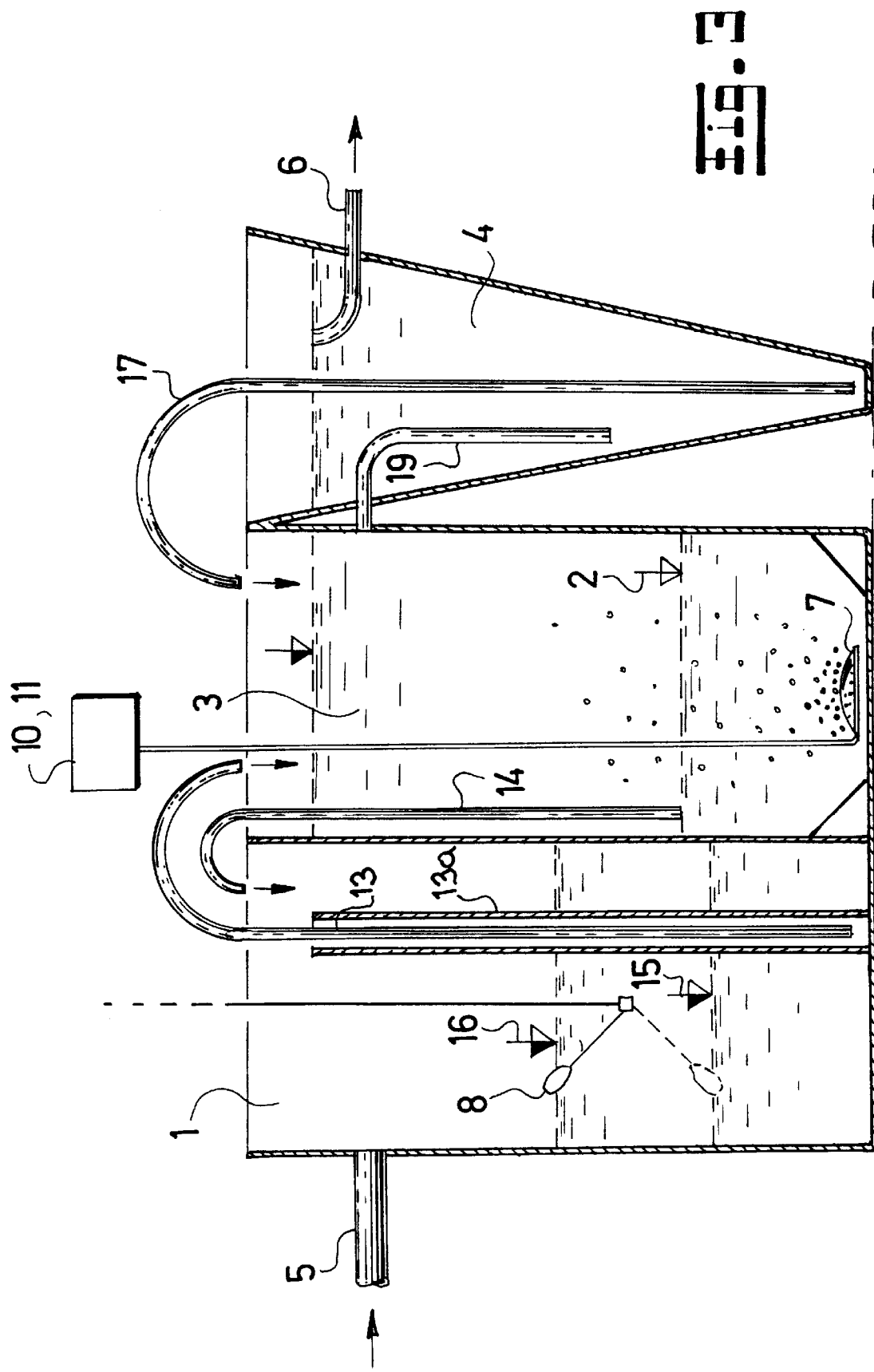

1

METHOD AND APPARATUS FOR SEWAGE WATER TREATMENT

TECHNICAL FIELD

The invention relates to the method and apparatus for a sewage water treatment using the biological activating system with suspended activated sludge in particular for small domestic sewage water treatment plants.

BACKGROUND ART

The biological method of-the sewage water treatment consists in utilizing the activated sludge formed by a mixture of various bacteria and small microorganisms. For its existence, this sludge needs organic substances contained in sewage water which is decomposited and thus cleared by these substances. The activating process is possible only due to a continuous oxidation introduced as a rule by blowing air into the activation tank.

For the sewage water treatment are used partly microorganisms seated firmly on their base in the form of various systems of biological filters and reactors wetted by sewage water, partly activating systems with suspended sludge where the sludge floccules are mixed together with sewage water and with air.

The sewage water treatment plants using the suspended sludge method know hirherto can be devided into systems using a continuous sewage water passage through the activation tank, and to systems using a discontinuous or intermittent passage.

In the continuous sewage water treatment systems, the sewage water is supplied after its coarse pre-treatment to the activation tank and, after a technologically necessitated period needed to its clearing, drained to a separated post-sedimentation tank together with the activated sludge. In this tank, the sludge is finally separated by sedimentation on the cleared water being drained away.

In the system using the discontinuous sewage water passage, the sewage water is supplied after its coarse pre-treatment to the activation tank either immediately or having been re-pumped from the equalizing tank. After the water treatment, the activation process is interrupted, i.e. the aeration and the water mixing, if any in the activation tank are stopped the cleared water being pumped or drawn by gravity to the drainage after the sludge sedimentation. After this, the activation tank is refilled the above described treatment cycle being repeated. Compared with the continuous sewage water treatment method, the post-sedimentation tanks can be omitted the activation one (SBR) being refilled in cycles.

The disadvantage of the above described sewage water activation treatment systems is their difficult utilization for small household treatment plants respecting in particular the demands connected with the treatment plant operation control.

In the activation treatment plants using the continuous sewage water passage, the sludge must be continuously re-pumped from the post-sedimentation tank to the sewage water inflow to the activation tank, As soon as the sludge concentration in this tank exceeds the permitted value, the excessive sludge must be pumped away from the sewage water treatment plant, A skilled operator is required to perform regular measuremants of the sludge concentration in the activation tank and to remove the sludge. In addition to this, a low sewage water inflow would cause an intermittent load of the activation tank. This would be followed by a deteriorated drainage water quality or by a necessity of overdimensioning the activation and the post-sedimentation tanks to obtain the required drainage water parameters.

With respect to a sludge accumulation in the activation tank, the hitherto known small sewage water treatment plants with a continuous water passage are designed either for a high sludge density where the sludge suspension must be maintained using a method with high demands on energy for up to 200 days till the sludge drainage without any interruptions of the water treatment plant function, or they require skilled operators draining regularly the sludge away from the activation tank. Both systems cannot be kept functioning for a longer time period without sewage water inflow due to the sludge autolysis followed by the sludge removal from the activation process introduced stepwise due to the consumption of activation substances in the activation tank. In this way, the water treatment plant function is substantially affected. The activation sewage water treatment plants with discontinuous water passage (SBR) are earmarked by a relatively sophisticated control systems thus being excessively expensive for their use in low capacity sewage water sources.

DISCLOSURE OF INVENTION

The above stated disadvantages are overcome by a method and apparatus for the sewage water treatment according to the present invention where sewage water is supplied to the equalizing tank and from here drained to the activation one: having been treated, the sewage water is supplied to the sedimentitation tank and, after the sludge sedimentation, to the drainage, The invention is based on an automatic interruption of the activation process after a water volume drop in the equalizing tank below the specified minimum level, which is followed by a drainage of the excessive sludge from the activation tank. If the sewage water level in the equalizing tank is increased in excess of its specified operating value, the sludge re-pumping is terminated the activation process being restarted.

After an interruption of the activation process, it is advantageous to drain the excessive sludge after a properly adjusted time interval only.

The activation sewage water treatment plant as defined by the present invention is formed by an activation tank provided with an air supply and with an overflow to the post-sedimentation tank. In addition this post-sedimentation tank is provided with a pump for re-pumping the sludge from the post-sedimentation tank to the activation one and with a drainage outlet. Before the activation tank is arranged an equalizing tank provided with sewage water inlet as well as with a raw water pump transporting sewage water from the equalizing tank to the activation tank, and with a float switch controlling the minimum and the operating sewage water level in the equalizing tank. This float switch stops the activation process and turns on successively the sludge pump when the sewage water drops under the minimum sewage water level and re-starts the activation process and turns off the sludge pumpe when the sewage water reaches the operating sewage water level.

The above described sewage water treatment plant is earmarked by an effective connection of the design elements characterizing the continuous and the discontinuous water passage system for sewage water treatment.

The advantages of the solution described by the present invention consist in the fact that, with a non-uniform sewage water inlet, the activation and the post-sedimentation tanks are uniformly loaded thus enabling their dimensioning to an average daily sewage water inlet volume. In addition, this enables the use of a fine-bubble activation which is the most advantageous biological sewage water treatment method from the viewpoint of the power consumption and the functional qualities to be used ever for the sewage water sources with minimum possible capacity values. The water treatment plant design described by the present invention enables additionally an increase in the activation tank sewage water level thus increasing the water volume contained herein. In this way, the necessary size of all the sewage-water treatment plant can be substantially reduced.

An outstanding advantage of this arangement is represented by the fact that no skilled plant operators are required due to the automatic sludge drainage from the activation tank as described by the present invention.

Another advantage is the substantial reduction of the daily air blowing time caused by frequent blower function interruptions during insufficient sewage water inlet periods: this reduces the danger of the sludge autolysis that would otherwise be caused by the lack of nutrients in the activation tank. During alternating re-pumping of cleared water from the activation tank to the equalizing tank and vice versa, the necessary nutrients are then supplied to the activation process from the sludge decomposing in the equalizing tank, This enables the operation of the whole water treatment plant for up to approximately 3 months without any sewage water inlet with no deterioration in the equipment treatment ability. This makes the sewage water treatment plant to be extremely suitable for use in leisure objects characterized by an intermittent operation in contradiction to other known types The suppression of the sewage water treatment plant activity after a longer interruption of the sewage water inflow can be supported by a higher setting of the minimum water level in the equalizing tank pulling the float a bit higher thus causing an increase in the re-pumping frequency and, in this way, a reduction of the total blowing time per day. Another possibility is represented by an incorporation of a timing switch into the treatment plant power supply turning the plant on only for a certain number of hours per day.

An important contribution to the environment quality that cannot be neglected is the ability of the activation system described by the present invention to perform a sewage water denitrification including a partial removal of phosphorus in the biological way which was either impossible or considerably complicated in small sewage water treatment plants used hitherto. In this system, the denitrifying action is introduced by interrupting the continuous activation process and by a successive re-pumping of the nitrified sewage water into an anoxical or an anaerobe equalizing tank environment. Successively, a mixture of cleared (denitrified) and raw water is pumped into the activation tank from the equalizing one. In this way, the effectivity of the treatment process is automatically increased by the system depending on the volume of the sewage water inflow. During low inflow period, removal of organic impurities and of nitrogen is provided by nitrification and successive denitrification. With an increase in the sewage water inflow, the number of re-pumping cycles is successively reduced thus lowering the degree of denitrification: a further reduction of the sewage water detention time in the activation tank leads to a successive reduction of the nitrification degree limiting lately the effectivity of the organic impurities removal. With a reduced sewage water inflow, the effectivity of the treatment process is automatically increased up to water denitrification. In this way, the system responds as an entity to the sewage water inflow volume whereby the maximum plant passage is given by the air raw water pump capacity (or by the capacity of another pump used) being designed usually for two or three times as much as the daily average sewage water volume. The most advantageous arrangement is the use of an air-lift pump (the mamoth one) increasing continuously its capacity with the increase in the water level in the equalizing tank and reducing it correspondingly with the decrease in the water level thus extending the total activation period duration till the system switchover.

The sewage water denitrification can be secured always by a proper dimensioning of the water treatment plant tanks in order that minimum water level in the equalizing tank can be reached more frequently during the plant operation thus increasing the frequency of the activation process interrupts.

BRIEF DESCRIPTION OF DRAWINGS

One of the possible implementations of the activation plant described by the present invention is shown in the attached drawings.

FIG. 1 illustrates the ground plan of the water treatment plant,

DESCRIPTION OF PREFERRED EMBODIMENT

Figure 2:
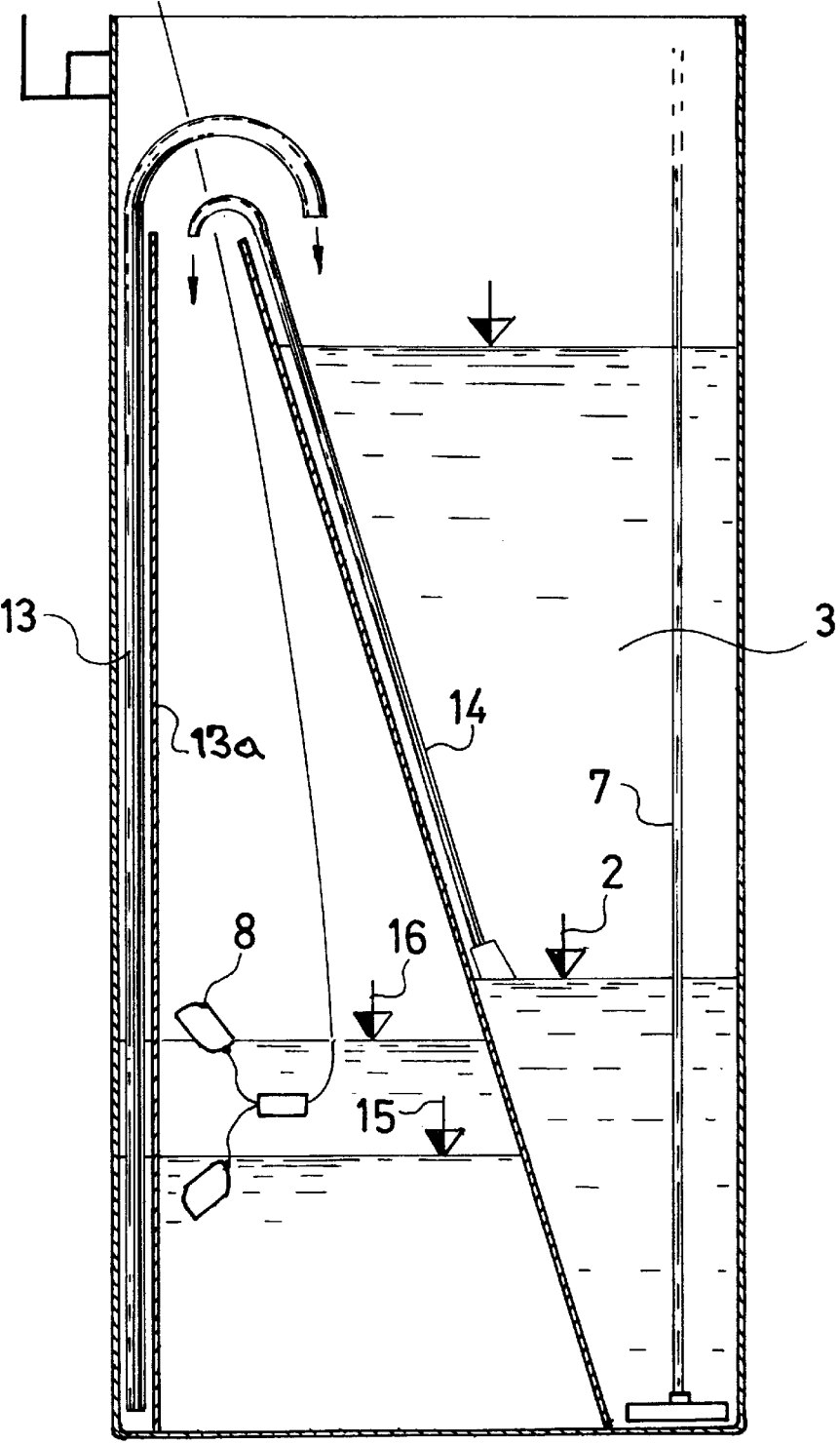
FIG. 2 contains the vertical section drawing while the principal plant diagram is shown in FIG. 3.

The activation-type sewage water treatment plant as illustrated by FIG. 1, 2 and FIG. 3 is formed by three functionally independent tanks connected into a single system. They are the equalizing tank 1 with sewage water inlet 5, the activation tank 3 with an air supply, i.e. with the aerating pipe 7 connected to two aerating compressors 10, 11 and with an overflow 19 to the post-sedimentation tank 4 and, finally, the post-sedimentation tank 4 with clear water drainage 6. The equalizing tank 1 is provided with the raw water pump 13 driven by the compressor 9: the pump is used to transport raw or pre-treated water into the activation tank 3. The equalizing tank 1 is further provided with a screen 13a, which permits transfer of raw water to the pump 13. In addition, the plant comprises a water level measuring device, usually a float switch 8 transforming the plant operating mode if the sewage water level in the equalizing tank 1 drops below its minimum setting 15 or exceeds its operation settin 16. The activation tank 3 is provided with sludge pump 14 connected to the sludge pumping compressor 12 used to re-pump the excessive sludge to the equalizing tank 1 up to the sludge level setting 2 in the activation tank 3. The post-sedimentation tank 4 is provided with the sludge recirculation pump 17 connected to the sludge recirculation compressor 18: this pump is used to re-pump the sedimented sludge to the activation tank 3.

Sewage water is supplied to the equalizing tank 1 via the sewage water supply 5. At the same time, the equalizing tank 1 is used to provide the primary sedimentation and to store the excessive sludge re-pumped from the activation tank 3. With a standard operation level in the equalizing tank 1, the sewage water inflow is re-pumped into the activation tank 3. Having been treated in the activation tank 3, the mixture of clear water and activation sludge is supplied to the post-sedimentation tank 4 the cleared water being drained by gravity from the post-sedimentation tank 4 thus leaving the water treatment plant. The sedimented sludge is permanently or intermittently re-pumped to the activation tank 3 by the sludge recirculation pump 17. A limited capacity of the raw water pump 13 helps to reach the condition that even with a non-uniform sewage water supply to the water treatment plant, the hydraulic load of the activation tank 3 as wel as of the post-sedimentation one 4 is uniform.

During the operation of these small household sewage water treatment plants with a non-uniform sewage water supply, the sewage water inflow e.g. at night is low enough so that the water level in the equalizing tank 1 drops below its minimum setting 15. This is the instant when the activation process is disabled by the float swich 8, i.e. the aerating compressors 10, 11 are turned off together with the raw water pump 13 thus puting the activation tank 3 out of operation. The sludge recirculation pump 17 is turned off together with the aeration if the air source for the sludge pump 17 is a common compressor for aerating and for the raw water pump 13 in water treatment plants with higher capacity values. If the sludge recirculation pump 17 is provided with an independent compressor and if the inflow 19 from the activation tank 3 to the post-sedimentation tank 4 is situated closely below the water level in the activation tank 3, the sludge recirculation pump 17 is kept permanently functioning.

At the same time, or better—after a specified time delay enabling the sedimentation of the activated sludge at the bottom of the activation tank 3, the sludge pump 14 is turned on starting to re-pump the contents of the activation tank 3 into the equalizing tank 1. The inflow pipe of the sludge pumpe 14 is placed above the activation tank 3 bottom at the sludge level 2, i.e. In the height of the required sludge layer in the activation tank 3 reached after the sedimentation time. As a rule, the sludge level 2, is set in such a way that the sludge after a 40 minutes sedimentation takes up ¼ up to ⅓ of the activation tank 3 volume which corresponds to a sludge concentration obtained by mixing of approximately 3 kg dry sludge in 1 $m^3$ of the activation mixture for a supposed sludge index of ca 80. In this way, the sludge pump 14 removes only the sludge in excess of the sludge level setting 2. The activation delay of the sludge pump 14 is chosen so that the sludge is sedimented at the bottom of the tank 3 before the pumping of the activation tank 3 contents otherwise the necessary sludge quantity in the activation tank 3 would be reduced due to pumping off the mixture of non-sedimented sludge with water if the sludge re-pumping were too frequent. Clear water is pumped off only having pumped off the excessive sludge to the inflow level of the sludge pump 14. As soon as the water level in the equalizing tank 1 reaches its operation setting 16 chosen always to exceed the minimum setting 15, the sludge pump 14 is turned off by the float switch 8 activating at the same time the aerating compressors 10, 11, the raw water pump 13 and, possibly, the sludge recirculation pump 17. The sewage water level in the equalizing tank 1 is increased to its operation setting 16 due to re-pumping a certain portion of the activation tank 3 contents to the equalizing tank 1 or due to the sewage water supply to the equalizing tank 1 or, possibly, due to a combination of both above mentioned causes. The system then continues its activity as a standart sewage water treatment plant with continuous sewage water passage in the equalizing tank 1 below the minimum water level setting 15.

The height of the minimum level setting 15 and that of the operation setting 16 must be chosen with respect to the actual sewage water inflow volume to the water treatment plant, to the amount of, oxygen dissolved in the activation tank 3 depending on the capacity of the aerating compressors 10, 11, and due to the substance load of the sewage water. Another viewpoint may be the requirement concerning the cleared water denitrification.

The start delay of the sludge pump 14 depends on the sludge sedimentation speed and on the depth of the activation tank 3. Its usual values are between 30 and 90 minutes.

The water treatment plant with no requirements concerning the water denitrification is run with an activation tank 3 volume and with an effective equalizing tank 1 volume usually equal to the daily average volume of the sewage water inflow to the water treatment plant. The minimim level setting 15 is chosen so (usually 0,7 m above the bottom of the equalizing tank 1) that the disabling of the aerating and the following sludge draw-off from the activation tank 3 occur approximately once in a day up to once in a week. The difference between the minimum level 15 and its operation value 16 is set to a small value, usually not more than 0,2 m in order to obtain the shortest possible activation interrupt time.

The water treatment plant where water denitrification is required is run with larger volumes of the equalizing tank 1 and of the activation tank 3: these volumes are usually equal to twice as much as the daily average water inflow into the treatment plant. It is necessary to provide a sufficient detention time of the sewage water in the activation tank 3 to obtain complete nitrification with a sufficient volume of the equalizing tank 1 available at the same time between the minimum and maximum levels 15 and 16 respectively to enable re-pumping of the maximum possible cleared water volume from the activation tank 3 to the anoxic environment of the equalizing tank 1 where this water is mixed with raw water and then denitrified. The minimum level 15 is then set to obtain the aeration disabling, the sludge draw-off from the activation tank 3 and the cleared water-re-pumping to the equalizing tank 1 at least once in a day.

I claim:

1. A method of treating sewage water using suspended activated sludge where sewage water is supplied to an equalizing tank and then re-pumped to an activation tank, which in turn supplies a post-sedimentation tank following a clearing process, and is sent to a drain subsequent to a remaining sludge sedimentation, wherein the method comprises:

interrupting a sludge activation process automatically when a level of the sewage water in the equalizing tank drops below a minimum level setting;

pumping off one of excess sludge and sludge with clear water from the activation tank to the equalizing tank following interrupting the activation process; and stopping the pumping off and restarting the activation process following the level of the sewage water rising above an operational level setting.

2. A method according to claim 1, wherein after interrupting the activation process, the pumping off occurs after a preset time delay.

3. An apparatus for treating sewage using a biological activating system with suspended activated sludge formed in an activation tank having an air supply and an overflow to a post-sedimentation tank provided with a first sludge pump for pumping sedimented sludge from a post-sedimentation tank to the activation tank and a drainage outlet, the apparatus comprising:

an equalizing tank in front of the activation tank having a sewage water inlet;

raw water pump means for transporting sewage water from the equalizing tank to the activation tank and a second sludge pump for pumping sludge from the activation tank to the equalizing tank; and a float switch in the equalizing tank having a minimum sewage water position for disabling the activation process and starting the second sludge pump and an operating water level position for stopping the second sludge pump and restarting the activation process.

* * * * *